Aug. 6, 1929. E. P. SHEERAN 1,723,212
PROCESS OF CLARIFYING LIQUIDS
Filed Nov. 30, 1925
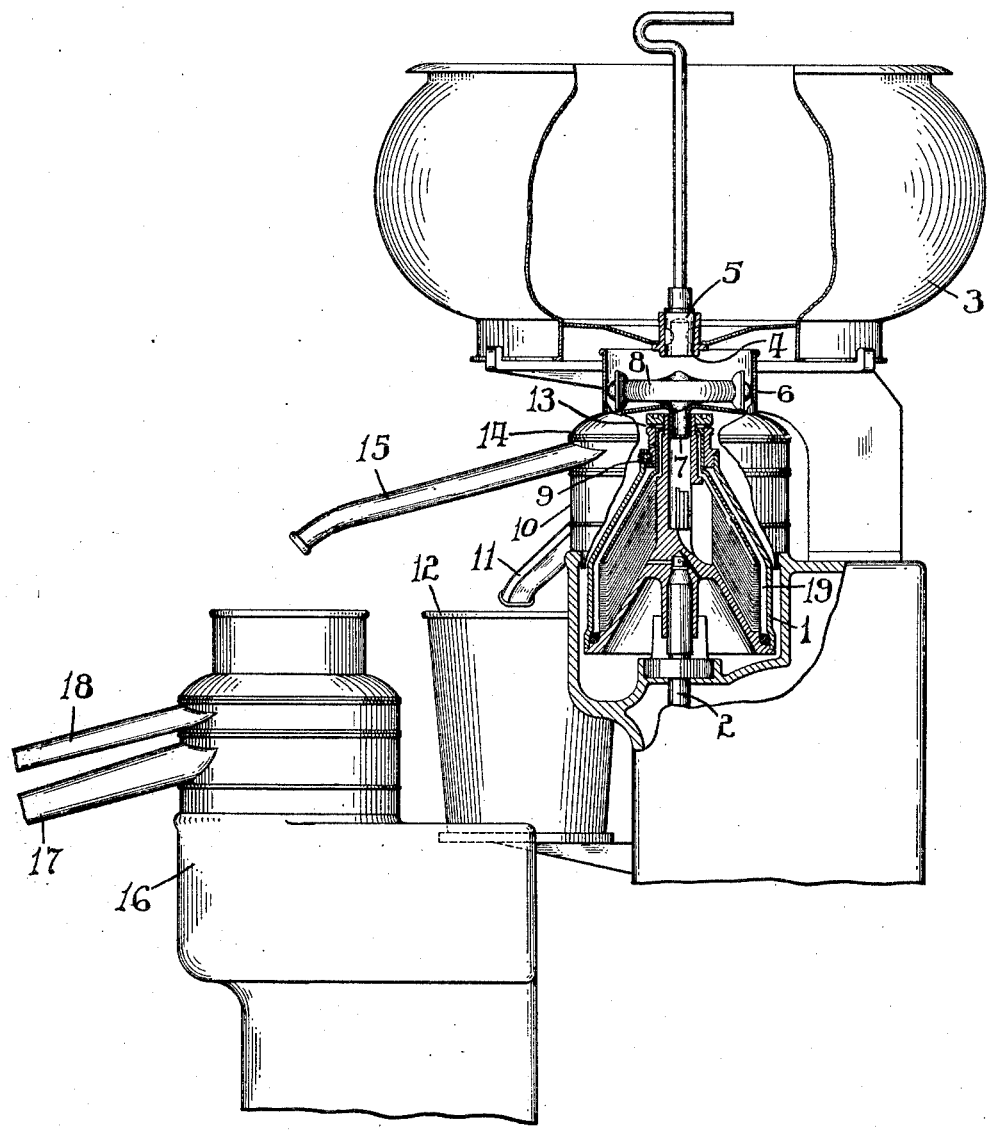
Inventor
Emmet P Sheeran.
By Owen & Owen
Attorneys Patented Aug. 6, 1929.

1,723,212

UNITED STATES PATENT OFFICE.

EMMET P. SHEERAN, OF FOSTORIA, OHIO, ASSIGNOR TO THE FOSTORIA SERUM COMPANY, OF FOSTORIA, OHIO, A CORPORATION OF OHIO.

PROCESS OF CLARIFYING LIQUIDS.

Application filed November 30, 1925. Serial No. 72,113.

This invention relates to a method of separating fluids, and more particularly to clarifying blood during the preparation of antihog cholera serum.

The usual method of accomplishing this clarification of blood, and similar separations, is to use a centrifuge; that is, to place the material to be separated in receptacles and whirl the receptacles about while supporting them so that their bottoms fly outward under the influence of centrifugal force. This action is continued until the centrifugal force drives the heavier portion of the contents of each receptacle to its bottom, after which the heavier and lighter portions of the contents of each receptacle are separated.

A centrifugal machine, constructed to receive a continuous stream of mixed fluid and deliver streams containing the heavier and lighter portions of the mixture, are well known. It is much simpler to run fluid through such a machine than to first segregate the lighter and heavier portions in a centrifuge, as described above, and thereafter separate them; but there are difficulties in the way of applying this continuous process where exact separation is desired along a definite line.

The nature of the difficulties and how I overcome them will appear as the description proceeds. My invention is described as applied to the clarification of blood.

The accompanying drawing is an elevation, partly in section, of one form of apparatus which may used in carrying out my process.

The bowl 1 of a centrifugal separator of any suitable design is mounted upon a spindle 2 which is adapted to be rotated at a high speed by any suitable mechanism, not shown.

A receptacle 3 is mounted above bowl 1, and has an outlet 4 governed by a valve 5. A receiving cup 6 is positioned between the said receptacle and bowl, and has a nozzle 7 adapted to enter the bowl axially. A float 8 in cup 6 is adapted to rise and shut off the flow from outlet 4 when liquid rises to a certain level in the cup.

There are two outlets from the bowl. The lower outlet is governed by a screw 9 and discharges fluid into an annular cup 10 having a discharge spout 11, which is shown in position to direct a stream into a receptacle 12.

The upper outlet 13 discharges into an annular cup 14 having a discharge spout 15. A second centrifugal machine 16 is positioned beneath spout 15. The discharge spouts 17 and 18 of the second said machine are shown disposed in vertical alignment.

In operation, a quantity of properly treated blood is placed in receptacle 3. After bowl 1 is rotating at sufficient speed, valve 5 is opened. It is best to open the valve but a small amount, and it is best to rotate the bowl somewhat more rapidly than a similar bowl would be rotated when used as a cream separator, for example. A machine similar to those used for cream separators may be employed, but in that case a very much less quantity should be run through the separator in a given length of time than would be the case with milk, and a somewhat higher speed of rotation is desirable.

At first the corpuscles and other heavy matter collect in the outer portion 19 of the bowl, so that there is comparatively little of this heavy matter passing out of either of the outlets until the outer portion of the bowl is filled with such heavy matter. Then the heavy matter begins to crowd up and out of the lower opening.

I prefer to direct spout 11 as well as spout 15, into machine 16 until the heavy material begins to flow from spout 11, whereupon spout 11 is turned into a separate receptacle, as shown in the drawings. In this way I avoid losing the serum which flows from spout 11 during the time the outer part 19 of the bowl is becoming filled with the heavy material.

It is desirable to make as complete separation as practicable, so that very little serum will be mixed with the material in receptacle 12 and very little of the heavy material will flow out of spout 15. For that reason, screw 9 is so adjusted that the flow from the lower outlet will accommodate the amount of heavy material as accurately as possible.

The percentage of the heavier material in the blood varies somewhat, and the rapidity of flow through the lower outlet varies somewhat with the condition of the blood, so that there is no position of screw 9 that will be correct for a uniform stream of blood entering the bowl under these varying conditions. The screw cannot be adjusted during the operation of the machine, but the stream flowing into the bowl can be varied so that approximately the proper proportion of the whole will flow out of the lower opening.

The size of the entering stream might be regulated by the size of nozzle 7, or an adjustable valve might be located in that nozzle. When there is no valve in the nozzle, I prefer to regulate the stream by valve 5. Screw 9 is adjusted so that the heavy portion will not flow out of the lower opening at a faster rate than that at which fairly complete separation will take place in the bowl. Then valve 5 is kept open as much as it can be without forcing some of the heavy portion out of the upper opening and discoloring the stream flowing from spout 15. In this way a fairly accurate separation may be maintained, the valve 5 being adjusted as different conditions of the blood may require.

While the separation may be made fairly complete in the above described manner, I have found it impossible to completely remove the serum from the heavy portion without having traces of the heavy portion remain in the serum. Even when this residue of the heavy portion is not noticeable at first, it is visible after the serum has stood awhile.

In order to remove this residue of the heavy portion, I run the apparently clear serum from spout 15 through a second separating device 16, similar to the device described above. The operation in the second separating machine is similar to that in the first described apparatus, except that there is so little of the residuary heavy portion that it does not fill the outer portion of the bowl until a considerable quantity of serum has passed through, and therefore clear serum passes out of both outlet openings and both spouts 17 and 18 deliver clear serum. There is so little of the residuary matter in the serum, after the first separation, that it would be practically impossible to so adjust openings as to flow off two streams, one of the clear serum and the other of the residuary substance; but by cleaning the bowl between successive runs, the residuary portion of the heavy substance may be collected in the outer portion of the bowl, and so completely removed from the serum.

As the serum is only a part of the blood which flows through the first separator and flows into the second separator, it remains longer in the second bowl and the separation is more thorough even if the speed of rotation is less than that of the first machine. Also, the fact that there is always a considerable portion of the serum outside of that which is in the escaping layer results in only the completely separated serum passing off, whereas, in the first machine, any serum as far out as as the layer which passes out of the lower opening would be likely to pass out of that opening, so there can be only a comparatively small amount of serum actually subjected to the separating process at any one time. These facts, added to the fact that the run is stopped before the heavy residue has filled the outer part of the bowl enough to approach dangerously close to the lower outlet, make possible the very complete removal of the heavy material without any considerable loss of serum.

If it is not convenient to use two separating devices, the blood may be passed through the first described machine in the manner related above, the machine may be cleaned to remove the heavy portion remaining in the bowl and then the serum may be passed through the same machine again, the residuary heavy material collecting in the outer portion 19 of the bowl and clear serum flowing from both spouts 11 and 15 during this second passage.

The stream entering the bowl must be small enough to allow the liquid ample time to thoroughly separate while in the bowl, and the lower opening must be small enough to allow the discharge of only the heavy portion. Then the inlet may be adjusted from time to time to make the amount passing out of the lower outlet correspond accurately with the percentage of the heavy portion. Thus a fairly accurate and complete separation may be accomplished.

In cream separation, the lower opening is small enough so that some of the heavier portion is forced out of the upper opening with the butter fat, the amount varying as the cream is thicker or thinner. No exact division is necessary between butter fat and skim-milk, as some of the latter is always present with the former in the cream; but in clarifying blood, it is undesirable to waste serum by leaving it with the waste material, and it is undesirable to force any of the heavy portion out with the lighter portion. It will be seen, therefore, that a much more exact division is desired in blood clarification than in cream separation, and this exact division is accomplished by the proper relation of the entering stream to the stream discharged by the lower outlet.

The proper adjustment of the lower outlet opening and the incoming stream enables a fairly accurate separation; but for complete separation, it is desirable to so adjust the devices that a slight amount of the heavy portion is discharged with the light portion, and then to run the light portion through a second bowl in the outer part of which this small residue of the heavy portion will collect and remain.

While described in connection with the clarification of blood, it will be apparent that my process is applicable in other cases where the accurate separation of liquids into heavy and light portions is desired, and various changes may be made in the described process within the term of the appended claim, which defines my invention.

What I claim is:

The process of clarifying blood which consists of separating serum from the heavy portion of the blood with a slight residue of said heavy portion remaining in the serum and then flowing the serum through a rotating bowl and collecting and retaining said residue in said bowl while discharging clarified serum therefrom.

In testimony whereof I have hereunto signed my name to this specification.

EMMET P. SHEERAN.